United States Patent
Cooley et al.

(10) Patent No.: US 9,249,829 B2
(45) Date of Patent: Feb. 2, 2016

(54) BEARING ASSEMBLIES, APPARATUSES, AND MOTOR ASSEMBLIES USING THE SAME

(71) Applicant: US SYNTHETIC CORPORATION, Orem, UT (US)

(72) Inventors: Craig H. Cooley, Saratoga Springs, UT (US); Timothy N. Sexton, Genola, UT (US)

(73) Assignee: US SYNTHETIC CORPORATION, Orem, UT (US)

( * ) Notice: Subject to any disclaimer, the term of this patent is extended or adjusted under 35 U.S.C. 154(b) by 0 days.

(21) Appl. No.: 14/150,102

(22) Filed: Jan. 8, 2014

(65) Prior Publication Data

US 2014/0116786 A1    May 1, 2014

Related U.S. Application Data

(63) Continuation of application No. 13/213,382, filed on Aug. 19, 2011, now Pat. No. 8,657,498.

(51) Int. Cl.
*F16C 33/04* (2006.01)
*F16C 33/10* (2006.01)
(Continued)

(52) U.S. Cl.
CPC .............. *F16C 33/043* (2013.01); *E21B 4/003* (2013.01); *F16C 17/02* (2013.01); *F16C 17/028* (2013.01);
(Continued)

(58) Field of Classification Search
CPC ........ F16C 17/02; F16C 17/04; F16C 33/108; F16C 33/1085; F16C 33/26; F16C 33/1075; F16C 33/043; F16C 2240/30; F16C 2352/00; F16C 2260/00; F16C 17/047; F16C 17/028; E21B 4/003; E21B 10/22
See application file for complete search history.

(56) References Cited

U.S. PATENT DOCUMENTS

| | | | |
|---|---|---|---|
| 2,744,799 A | 5/1956 | Howarth et al. | |
| 3,512,854 A | 5/1970 | Herbage, Jr. et al. | |

(Continued)

FOREIGN PATENT DOCUMENTS

| | | |
|---|---|---|
| GB | 1014598 | 12/1965 |
| JP | 52067442 | 6/1977 |

(Continued)

OTHER PUBLICATIONS

International Search Report and Written Opinion from International Application No. PCT/US2012/046703 mailed Sep. 24, 2013.
(Continued)

*Primary Examiner* — Alan B Waits
(74) *Attorney, Agent, or Firm* — Dorsey & Whitney LLP

(57) ABSTRACT

Bearing assemblies, apparatuses, and motor assemblies using the same are disclosed. In an embodiment, a bearing assembly includes a plurality of superhard bearing elements distributed circumferentially about an axis. At least some of the superhard bearing elements may include a first end surface, a second end surface generally opposite the first end surface, a first side surface extending between the first end surface and the second end surface, a second side surface generally opposite the first side surface, and a bearing surface extending between the first end surface, the second end surface, the first side surface and the second side surface. Such superhard bearing elements may also include a ramped feature negatively sloping away from the bearing surface. The bearing assembly may further include a support ring that carries the plurality of superhard bearing elements.

20 Claims, 11 Drawing Sheets

(51) Int. Cl.
*F16C 17/02* (2006.01)
*F16C 17/04* (2006.01)
*F16C 33/26* (2006.01)
*E21B 4/00* (2006.01)

(52) U.S. Cl.
CPC .............. *F16C 17/04* (2013.01); *F16C 17/047* (2013.01); *F16C 33/108* (2013.01); *F16C 33/1075* (2013.01); *F16C 33/26* (2013.01); *F16C 2206/00* (2013.01); *F16C 2240/30* (2013.01); *F16C 2352/00* (2013.01)

(56) References Cited

U.S. PATENT DOCUMENTS

| | | | |
|---|---|---|---|
| 3,565,498 | A | 2/1971 | Leopard et al. |
| 3,828,610 | A | 8/1974 | Swearingen |
| 4,863,291 | A | 9/1989 | Heshmat et al. |
| 5,364,192 | A | 11/1994 | Damm |
| 5,602,945 | A | 2/1997 | Davis |
| 5,973,878 | A | 10/1999 | Yoshida et al. |
| 6,976,788 | B2 | 12/2005 | Honda et al. |
| 7,866,418 | B2 | 1/2011 | Bertagnolli et al. |
| 7,870,913 | B1 | 1/2011 | Sexton et al. |
| 7,896,551 | B2 | 3/2011 | Cooley et al. |
| 7,998,573 | B2 | 8/2011 | Qian et al. |
| 8,034,136 | B2 | 10/2011 | Sani |
| 8,236,074 | B1 | 8/2012 | Bertagnolli |
| 2007/0046120 | A1 | 3/2007 | Cooley et al. |
| 2009/0097788 | A1* | 4/2009 | Cooley et al. .................. 384/107 |
| 2013/0044971 | A1 | 2/2013 | Cooley et al. |

FOREIGN PATENT DOCUMENTS

| | | |
|---|---|---|
| JP | 57163723 | 10/1982 |
| JP | 05118320 | 5/1993 |
| WO | WO/2013/028277 | 2/2013 |

OTHER PUBLICATIONS

U.S. Appl. No. 13/213,382, Feb. 26, 2013, Office Action.
U.S. Appl. No. 13/213,382, Jun. 25, 2013, Office Action.
U.S. Appl. No. 13/213,382, Oct. 9, 2013, Notice of Allowance.
U.S. Appl. No. 13/213,382, Nov. 22, 2013, Notice of Allowance.
U.S. Appl. No. 13/213,382, Feb. 5, 2014, Issue Notification.

* cited by examiner

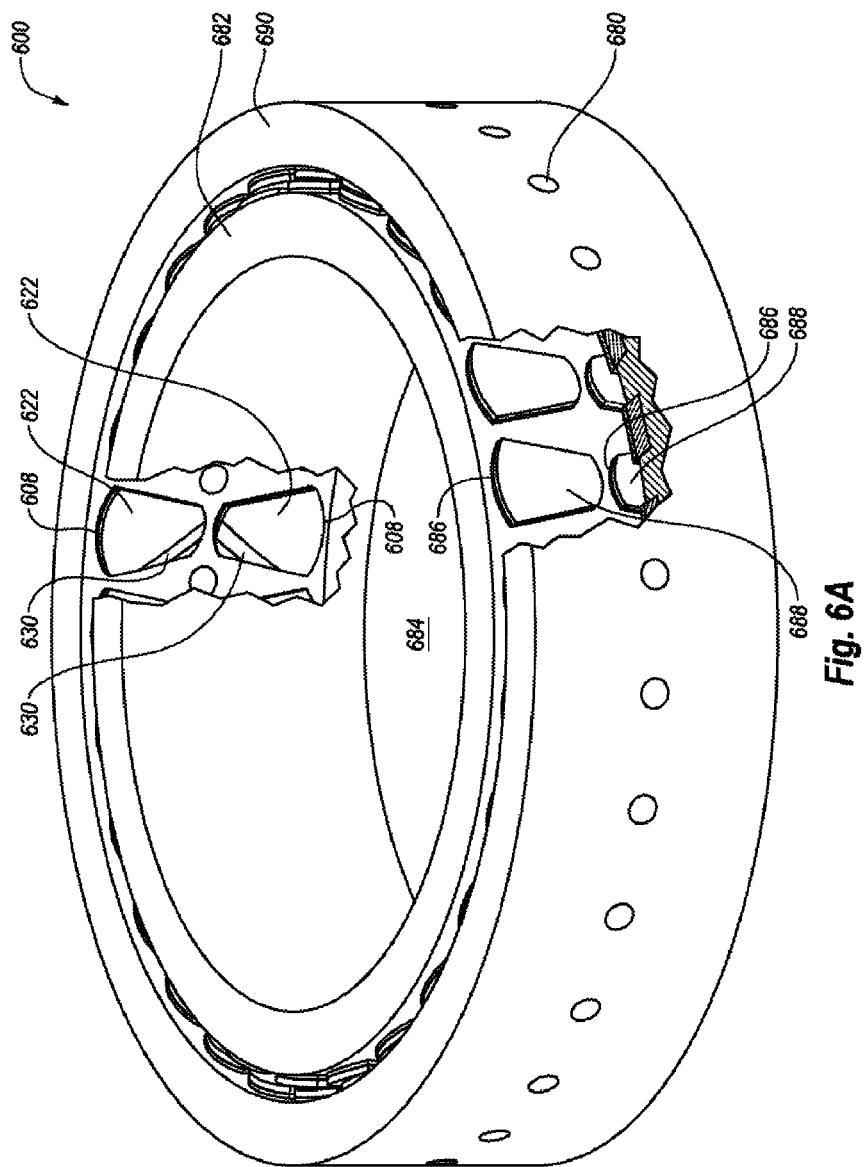

BEARING ASSEMBLIES, APPARATUSES, AND MOTOR ASSEMBLIES USING THE SAME

CROSS-REFERENCE TO RELATED APPLICATIONS

This application is a continuation of U.S. application Ser. No. 13/213,382 filed on 19 Aug. 2011, the disclosure of which is incorporated herein, in its entirety, by this reference.

BACKGROUND

Subterranean drilling systems that employ downhole drilling motors are commonly used for drilling boreholes in the earth for oil and gas exploration and production. A subterranean drilling system typically includes a downhole drilling motor that is operably connected to an output shaft. A pair of thrust-bearing apparatuses also can be operably coupled to the downhole drilling motor. A rotary drill bit configured to engage a subterranean formation and drill a borehole can be connected to the output shaft. As the borehole is drilled with the rotary drill bit, pipe sections may be connected to the subterranean drilling system to form a drill string capable of progressively drilling the borehole to a greater size or depth within the earth.

Each thrust-bearing apparatus includes a stator that does not rotate relative to the motor housing and a rotor that is attached to the output shaft and rotates with the output shaft. The stator and rotor each includes a plurality of bearing elements that may be fabricated from polycrystalline diamond compacts ("PDCs") that provide diamond bearing surfaces that bear against each other during use.

In operation, high-pressure drilling fluid may be circulated through the drill string and power section of the downhole drilling motor, usually prior to the rotary drill bit engaging the bottom of the borehole, to generate torque and rotate the output shaft and the rotary drill bit attached to the output shaft. When the rotary drill bit engages the bottom of the borehole, a thrust load is generated, which is commonly referred to as "on-bottom thrust" that tends to compress and is carried, at least in part, by one of the thrust-bearing apparatuses. Fluid flow through the power section may cause what is commonly referred to as "off-bottom thrust," which is carried, at least in part, by the other thrust-bearing apparatus. The drilling fluid used to generate the torque for rotating the rotary drill bit exits openings formed in the rotary drill bit and returns to the surface, carrying cuttings of the subterranean formation through an annular space between the drilled borehole and the subterranean drilling system. Typically, a portion of the drilling fluid is diverted by the downhole drilling motor to cool and lubricate the bearing elements of the thrust-bearing apparatuses.

The on-bottom and off-bottom thrust carried by the thrust-bearing apparatuses can be extremely large. The operational lifetime of the thrust-bearing apparatuses often can determine the useful life of the subterranean drilling system.

SUMMARY

Various embodiments of the invention relate to bearing assemblies, bearing apparatuses and motor assemblies that include superhard bearing elements configured to improve lubrication and reduce wear of the superhard bearing elements during use. In an embodiment, a bearing assembly may include a plurality of superhard bearing elements distributed circumferentially about an axis. At least some of the superhard bearing elements may include a first end surface, a second end surface generally opposite the first end surface, a first side surface extending between the first end surface and the second end surface, and a second side surface generally opposite the first side surface. The at least some of the superhard bearing elements may also include a bearing surface extending between the first end surface, the second end surface, the first side surface and the second side surface, and a ramped feature negatively sloping away from the bearing surface. The bearing assembly may further include a support ring that carries the plurality of superhard bearing elements.

In an embodiment, a bearing assembly may include a plurality of superhard bearing elements distributed circumferentially about an axis. Each of the superhard bearing elements includes a bearing surface. At least some of the plurality of superhard bearing elements define a plurality of converging channels therebetween. The converging channels may be configured to direct fluid flow onto at least some of the bearing surfaces of the superhard bearing elements during use. The bearing assembly may also include a support ring that carries the plurality of superhard bearing elements.

In an embodiment, a bearing apparatus includes two bearing assemblies. At least one of the two bearing assemblies may be configured as any of the disclosed bearing assembly embodiments that are configured to improve lubrication and reduce wear of the superhard bearing elements during use.

Other embodiments include downhole motors for use in drilling systems and subterranean drilling systems that may utilize any of the disclosed bearing apparatuses.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments, wherein identical reference numerals refer to identical or similar elements or features in different views or embodiments shown in the drawings.

FIG. 1C is a front view of one of the superhard bearing elements shown in FIG. 1B.

FIG. 1D is a side view of one of the superhard bearing elements shown in FIG. 1B.

FIG. 6A is an isometric cutaway view of a radial bearing apparatus that may utilize any of the disclosed radial bearing assemblies according to various embodiments.

DETAILED DESCRIPTION

Figure 1A:
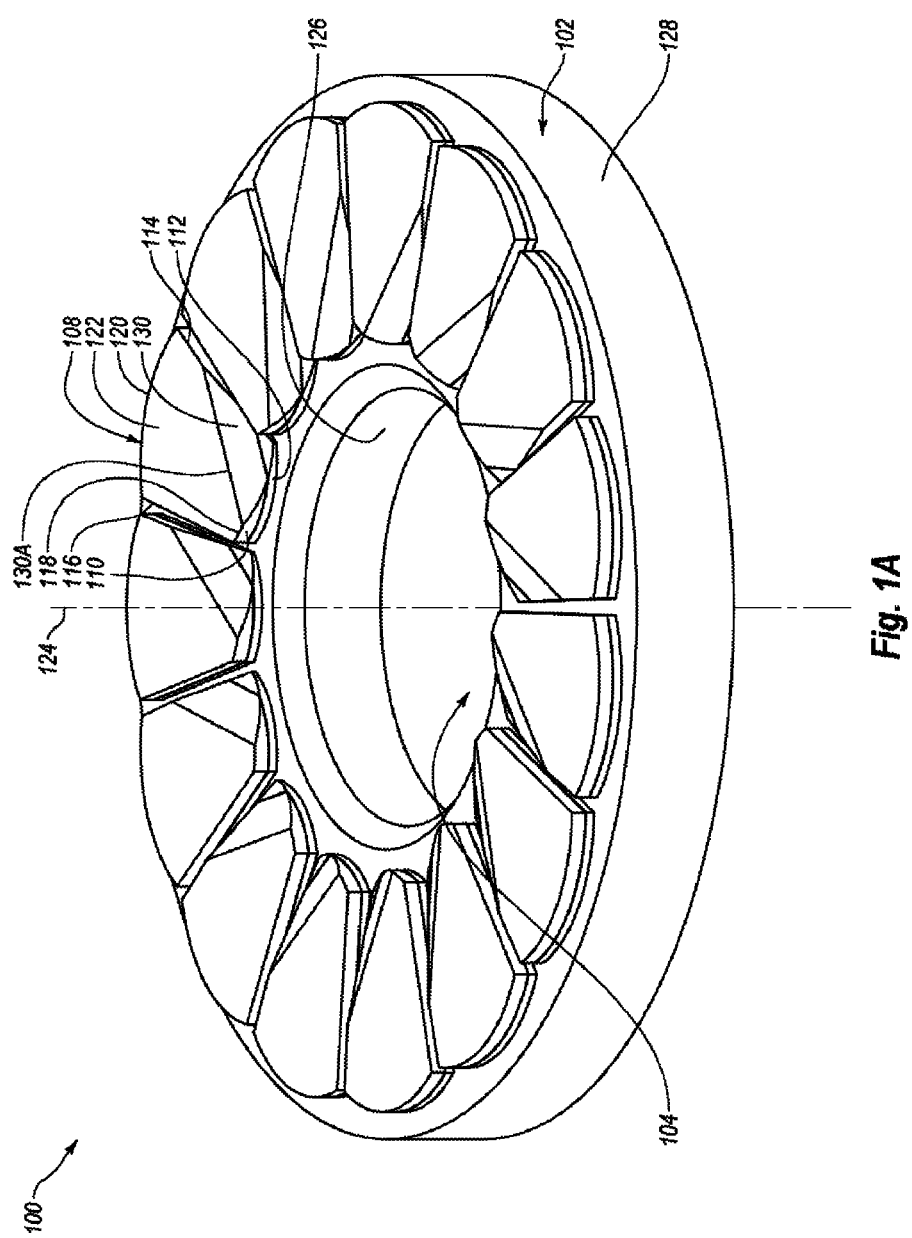
FIG. 1A is an isometric view of a thrust-bearing assembly according to an embodiment.
Figure 1B:
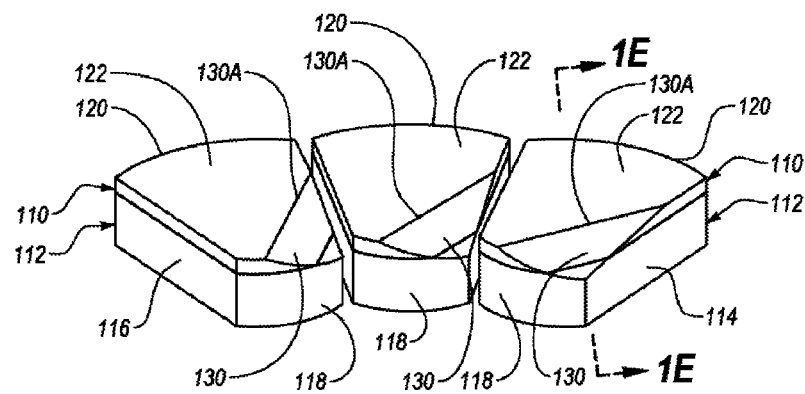
FIG. 1B is an isometric view of three side-by-side superhard bearing elements removed from the thrust-bearing assembly shown in FIG. 1A.

Embodiments of the invention relate to bearing assemblies, bearing apparatuses and motor assemblies that include superhard bearing elements configured to improve lubrication and/or reduce wear of the superhard bearing elements. FIG. 1A is an isometric view of a thrust-bearing assembly according to an embodiment. FIG. 1B is an isometric view of three adjacent superhard bearing elements removed from the thrust-bearing assembly shown in FIG. 1A.

Figure 1E:
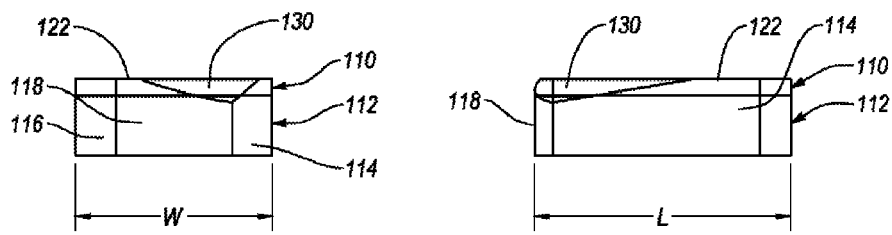
FIG. 1E is a cross-sectional view taken along line 1E-1E of one of the superhard bearing elements shown in FIG. 1B.
Figure 1E:
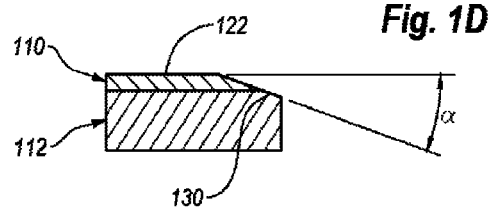

The thrust-bearing assembly 100 may form a stator or a rotor of a thrust-bearing apparatus used in a subterranean drilling system. As shown in FIGS. 1A and 1B, the thrust-bearing assembly 100 may include a support ring 102 defining an opening 104 through which a shaft (not shown) of, for example, a downhole drilling motor may extend. The support ring 102 may be made from a variety of different materials. For example, the support ring 102 may comprise carbon steel, stainless steel, tungsten carbide, or another suitable material. The support ring 102 may include a plurality of recesses 106 (shown in FIG. 1G) formed therein.

The thrust-bearing assembly 100 further may include a plurality of superhard bearing elements 108. As shown in FIG. 1B, the superhard bearing elements 108 may include a superhard table 110 bonded to a substrate 112 including a first substantially planar side surface 114, a second substantially planar side surface 116, a first end surface 118, a second end surface 120, and a bearing surface 122 of the superhard table 110. The superhard bearing elements 108 are illustrated in FIG. 1A being distributed circumferentially about a thrust axis 124 along which a thrust force may be generally directed during use. At least a portion of the superhard bearing elements 108 may be partially disposed in a corresponding one of the recesses 106 (shown in FIG. 1G which is an isometric cutaway view taken along line 1G-1G of the thrust-bearing assembly shown in FIG. 1F) of the support ring 102 and secured partially therein via brazing, press-fitting, fastening with a fastener, or another suitable technique. As used herein, a "superhard bearing element" is a bearing element including a bearing surface that is made from a material exhibiting a hardness that is at least as hard as tungsten carbide.

In any of the embodiments disclosed herein, the superhard bearing elements 108 may be made from one or more superhard materials, such as polycrystalline diamond, polycrystalline cubic boron nitride, silicon carbide, tungsten carbide, or any combination of the foregoing superhard materials. For example, the superhard table 110 may be formed from polycrystalline diamond and the substrate 112 may be formed from cobalt-cemented tungsten carbide. Furthermore, in any of the embodiments disclosed herein, the polycrystalline diamond table may be leached to at least partially or substantially completely remove a metal-solvent catalyst (e.g., cobalt, iron, nickel, or alloys thereof) that was used to initially sinter precursor diamond particles that form the polycrystalline diamond. In another embodiment, an infiltrant used to re-infiltrate a preformed leached polycrystalline diamond table may be leached or otherwise removed to a selected depth from a bearing surface. Moreover, in any of the embodiments disclosed herein, the polycrystalline diamond may be un-leached and include a metal-solvent catalyst (e.g., cobalt, iron, nickel, or alloys thereof) that was used to initially sinter the precursor diamond particles that form the polycrystalline diamond and/or an infiltrant used to re-infiltrate a preformed leached polycrystalline diamond table. Examples of methods for fabricating the superhard bearing elements and superhard materials from which the superhard bearing elements can be made are disclosed in U.S. Pat. Nos. 7,866,418 and 7,998,573; and co-pending U.S. patent application Ser. Nos. 11/545,929 and 11/983,619; the contents of each of the foregoing patents and applications are incorporated herein, in their entirety, by this reference.

The diamond particles that may be used to fabricate the superhard table 110 in a high-pressure/high-temperature process ("HPHT") may exhibit a larger size and at least one relatively smaller size. As used herein, the phrases "relatively larger" and "relatively smaller" refer to particle sizes (by any suitable method) that differ by at least a factor of two (e.g., 30 μm and 15 μm). According to various embodiments, the diamond particles may include a portion exhibiting a relatively larger size (e.g., 30 μm, 20 μm, 15 μm, 12 μm, 10 μm, 8 μm) and another portion exhibiting at least one relatively smaller size (e.g., 6 μm, 5 μm, 4 μm, 3 μm, 2 μm, 1 μm, 0.5 μm, less than 0.5 μm, 0.1 μm, less than 0.1 μm). In an embodiment, the diamond particles may include a portion exhibiting a relatively larger size between about 10 μm and about 40 μm and another portion exhibiting a relatively smaller size between about 1 μm and 4 μm. In some embodiments, the diamond particles may comprise three or more different sizes (e.g., one relatively larger size and two or more relatively smaller sizes), without limitation.

Additionally, in any of the embodiments disclosed herein, the superhard bearing elements 108 may be free-standing (e.g., substrateless) and formed from a polycrystalline diamond body that is at least partially or fully leached to remove a metal-solvent catalyst initially used to sinter the polycrystalline diamond body.

FIGS. 1C and 1D are front and side views, respectively, of one of the superhard bearing elements 108 shown in FIG. 1B. The superhard bearing elements 108 may have a width W which is substantially less than a length L of the superhard bearing elements 108, although it will be appreciated that these dimensions are illustrative only. In fact, in other embodiments, the superhard bearing elements 108 may have widths W substantially equal to their lengths L or widths W substantially greater than their lengths L and a variety of other dimensions.

Referring now to FIGS. 1B-1D, the first substantially planar side surface 114 and the second substantially planar side surface 116 of each superhard bearing element 108 may extend between the first end surface 118 and the second end surface 120 and vice versa. The first substantially planar side surface 114 and the second substantially planar side surface 116 may be non-parallel relative to each other such that the superhard bearing elements 108 have a wedge-like shape. In other embodiments, however, the first substantially planar side surface 114 and the second substantially planar side surface 116 may be configured such that the superhard bearing elements 108 have in a top plan view a generally isosceles trapezium shape, a generally rectangular shape, a generally oval shape, or other shape.

In the illustrated embodiment, both the first end surface 118 and the second end surface 120 may have a convex curvature. In other embodiments, the first end surface 118 may have a concave curvature and the second end surface 120 may have a convex curvature to at least partially complement an inner peripheral surface 126 and an outer peripheral surface 128 of the support ring 102. In other embodiments, the first end surface 118 and the second end surface 120 may have planar configurations, symmetrical edge configurations, asymmetrical edge configurations, curved edge configurations, irregular edge configurations, or other edge configurations. For example, the first end surface 118 and the second end surface 120 may take the form of any portion of a circle, oval, square, rectangle, rhombus, triangle, or virtually any other simple, complex, regular, irregular, symmetrical, or non-symmetrical geometric shape. Moreover, the first end surface 118 may have an area greater than an area of the second end surface 120, although this feature is not necessary. In other embodiments, the first end surface 118 and the second end surface 120 may be substantially the same size.

The bearing surface 122 of the superhard table 110 may extend between the first end surface 118, the second end surface 120, the first substantially planar side surface 114, the second substantially planar side surface 116, and may be substantially planar and generally lie in common plane (shown in FIG. 1G) with the bearing surfaces 122 of the other superhard bearing elements 108. The superhard bearing elements 108 may be pre-machined to tolerances and mounted in the support ring 102 and/or mounted to the support ring 102 and the bearing surfaces 122 thereof and planarized (e.g., by lapping and/or grinding) so that the bearing surfaces 122 are substantially coplanar. Optionally, one or more of the superhard bearing elements 108 may exhibit a peripherally extending edge chamfer. However, in other embodiments, the edge chamfer may be omitted.

At least some of the superhard bearing elements 108 may include at least one ramped feature. The at least one ramped feature may be configured to direct lubricating fluid onto the bearing surface 122, as discussed in more detail below. In an embodiment, a ramped surface 130 may negatively slope away from the bearing surface 122 at an angle "α" (shown in FIG. 1E) relative to the bearing surface 122. The angle "α" may be about 10 degrees to about 80 degrees; about 20 degrees to about 70 degrees; about 30 degrees to about 60 degrees; about 35 degrees to about 55 degrees; about 40 degrees to about 50 degrees, or any angle suitable to promote directing lubricating fluid onto the bearing surface 122 during use.

The ramped surface 130 may extend between the first substantially planar side surface 114, the first end surface 118, and an edge 130A formed on the bearing surface 122 extending between the first end surface 118 and the first substantially planar side surface 114. In another embodiment, the ramped surface 130 may extend between the second substantially planar side surface 116, the first end surface 118, and an edge formed on the bearing surface 122 extending between the first end surface 118 and the second substantially planar side surface 116. In another embodiment, at least some of the superhard bearing elements 108 may include a plurality of ramped surfaces 130. For example, at least some of the superhard bearing elements 108 may include a first ramped surface 130 extending between the first substantially planar side surface 114, the first end surface 118, and an edge formed on the bearing surface 122; and a second ramped surface extending between the second substantially planar side surface 116, the first end surface 118, and an edge formed on the bearing surface 122. The ramped surface 130 may be a flat surface, a curved surface (e.g., forming a fillet or a radius), a continuous surface, or a non-continuous surface. While the ramped surface 130 is shown extending through the superhard table 110 and a portion of the substrate 112, the ramped surface 130 may extend through the entire superhard table 110 and substrate 112 or only through the superhard table 110 or through any depth on the superhard bearing elements 108 suitable to promote fluid flow onto the bearing surface 122. For example, in an embodiment, the ramped surface 130 may extend between about 0.010 inches and about 0.030 inches below the bearing surface 122. Such a configuration may provide the ramped surface 130 a gradual slope suitable to promote fluid flow onto the bearing surface 122.

While all the superhard bearing elements 108 are shown including substantially identical ramped surfaces 130, in other embodiments, only a portion of the superhard bearing elements 108 may include ramped surfaces 130 and/or the superhard bearing elements 108 may have ramped surfaces 130 of varying sizes and configurations.

Figure 1F:
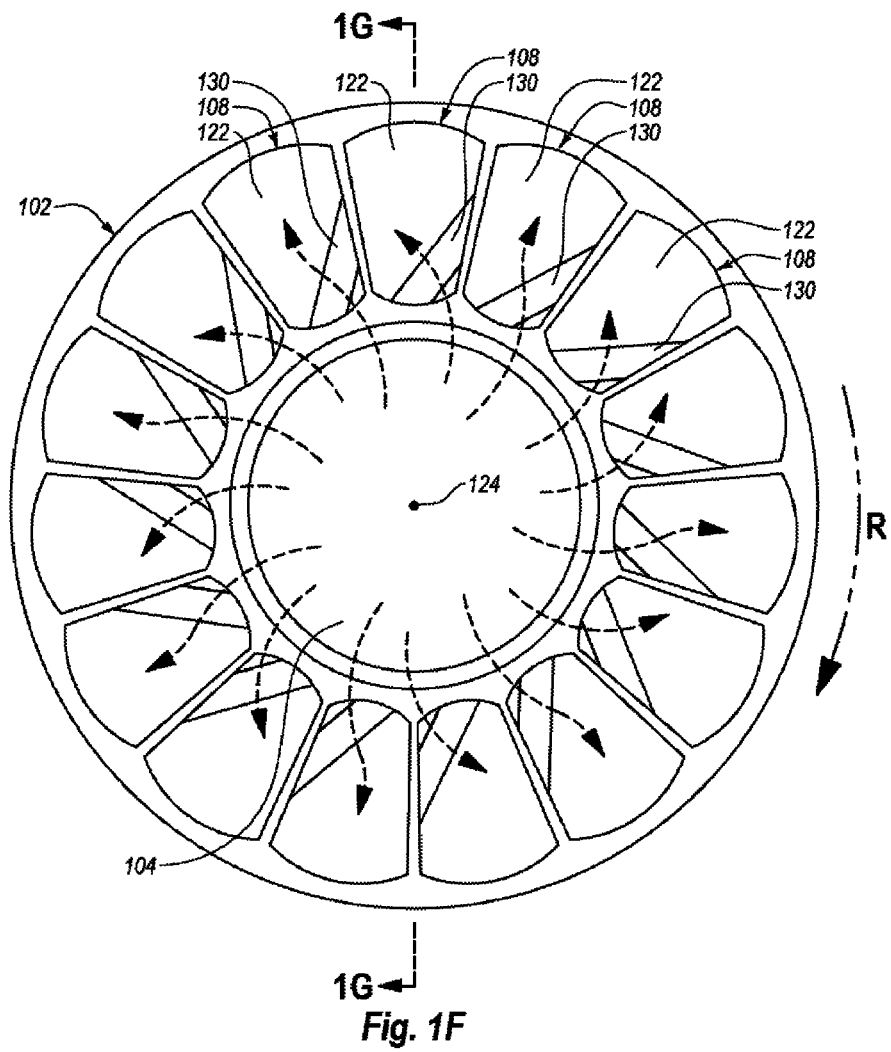
FIG. 1F is a top plan view of the thrust-bearing assembly shown in FIG. 1A.
Figure 1G:
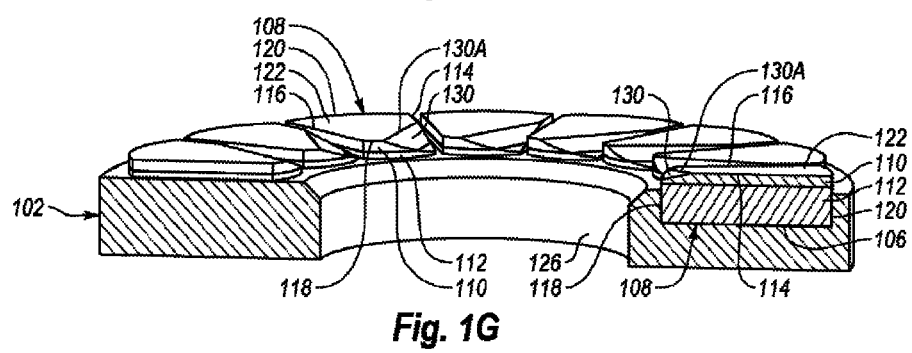
FIG. 1G is an isometric cutaway view taken along line 1G-1G of the thrust-bearing assembly shown in FIG. 1F.

Referring now to FIG. 1F, the superhard bearing elements 108 may be circumferentially distributed about the thrust axis 124 such that the ramped surface 130 of each superhard bearing element 108 is oriented in a rotational direction R of the support ring 102. As shown by flow direction arrows, when the support ring 102 rotates in the direction R, the ramped surfaces 130 may direct lubricating fluid flowing out from the center opening 104 of the support ring 102 onto the bearing surfaces 122 of the superhard bearing elements 108. In an embodiment, the superhard bearing elements 108 may be distributed about the support ring 102 such that the ramped surfaces 130 of some of the superhard bearing element 108 are oriented in a first rotational direction of the support ring 102 about the thrust axis 124 while the ramped surfaces 130 of other superhard bearing elements 108 are oriented in a generally opposite second rotational direction of the support ring 102 about the thrust axis 124. Such a configuration may allow the ramped surfaces 130 to direct lubricating fluid onto the bearing surfaces 122 of the superhard elements 108 in both the first rotational direction, the second rotational direction, or both directions. Accordingly, wear on the superhard bearing elements 108 may be significantly reduced because of multi-directional lubrication.

Figure 2A:
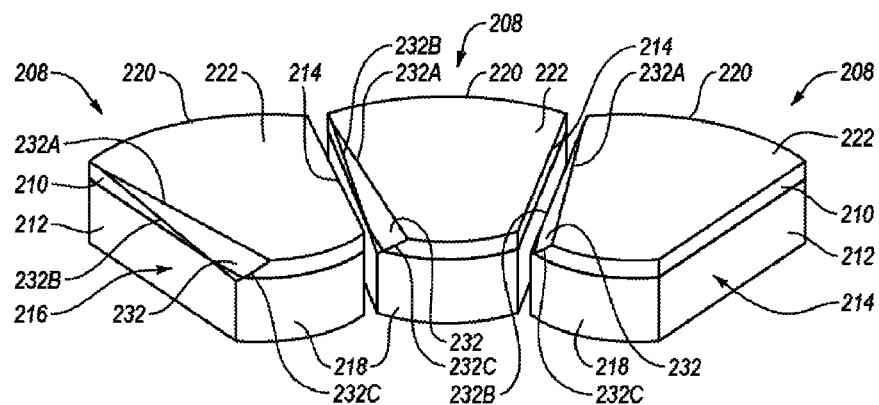
FIG. 2A is an isometric view of three side-by-side superhard bearing elements according to an embodiment.

FIG. 2A is an isometric view of three side-by-side superhard bearing elements according to an embodiment. At least some of the superhard bearing elements 208 may include a superhard table 210 bonded to a substrate 212 including a first side surface 214, a second side surface 216, a first end surface 218, a second end surface 220, and a bearing surface 222 of the superhard table 210 extending between the first end surface 218 and the second end surface 220. The superhard bearing elements 208 may be made from any of the materials discussed above for the superhard bearing elements 108. In the illustrated embodiment, both the first end surface 218 and the second end surface 220 may have a convex curvature. In another embodiment, the first end surface 218 may have a concave curvature and the second end surface 220 may have a convex curvature to at least partially complement an inner peripheral surface 226 and the outer peripheral surface 228 of the support ring 202 (shown in FIG. 2B). In another embodiment, the first end surface 218 and the second end surface 220 may have straight edges or other edge configurations. In addition, the first end surface 218 and the second end surface 220 may have different or substantially equal lengths defined between the first side surface 214 and the second side surface 216.

The first side surface 214 and the second side surface 216 may extend between the first end surface 218 and the second end surface 220. In the illustrated embodiment, the first side surface 214 and the second side surface 216 may be angled relative to each other such that the superhard bearing elements 208 have a wedge-like shape. In other embodiments, however, the first side surface 214 and the second side surface 216 may be configured such that the superhard bearing elements 208 have a generally rectangular shape, oval shape, triangular shape, or other shape.

Referring still to FIG. 2A, the superhard bearing elements 208 may define converging channels 292 (shown in FIG. 2C) extending between adjacent ones of the superhard bearing elements 208. The converging channels 292 (shown in FIG. 2C) may be configured to help direct lubricating fluid onto the bearing surfaces 222 during use. For example, in an embodiment, the converging channels 292 (shown in FIG. 2C) may be defined at least partially between a banked wall 232 on the second side surface 216 of the superhard bearing elements 208 and the first side surface 214 of an adjacent one of the superhard bearing elements 208. The banked walls 232 may be at least partially defined by a first edge 232A on the bearing surface 222 that extends between the second side surface 216 and the first end surface 218, a second edge 232B on the second side surface 216 that extends between the second side surface 216 and the first end surface 218, and a third edge 232C on a first end surface 218 that extends between the second side surface 216 and the first end surface 218. In an embodiment, the banked wall 232 may negatively slope away from the bearing surface 222 at an angle of about 10 degrees to about 80 degrees; about 20 degrees to about 70 degrees; about 30 degrees to about 60 degrees; about 35 degrees to about 55 degrees; about 40 degrees to about 50 degrees; or any angle suitable to promote directing lubricating fluid onto the bearing surface 222 during use.

While the banked wall 232 is shown extending completely through the superhard table 210 and a portion of the substrate 212, the banked wall 232 may extend through the superhard table 210 only, through a portion of the superhard table 210, or through any depth on the superhard bearing element 208. Moreover, the banked wall 232 may be a substantially flat inclined surface, a curved surface, a continuous surface, or a non-continuous surface. In addition, the banked wall 232 is shown formed only on the second side surface 216, however, the banked wall 232 may be formed on the first side surface 214, or on both the first side surface 214 and the second side surface 216.

While all the superhard bearing elements 208 are shown including substantially identical banked walls 232, in other embodiments, only a portion of the superhard bearing elements 208 may include the banked walls 232 and/or the superhard bearing elements 208 may have banked walls 232 of varying sizes and configurations.

Figure 2B:
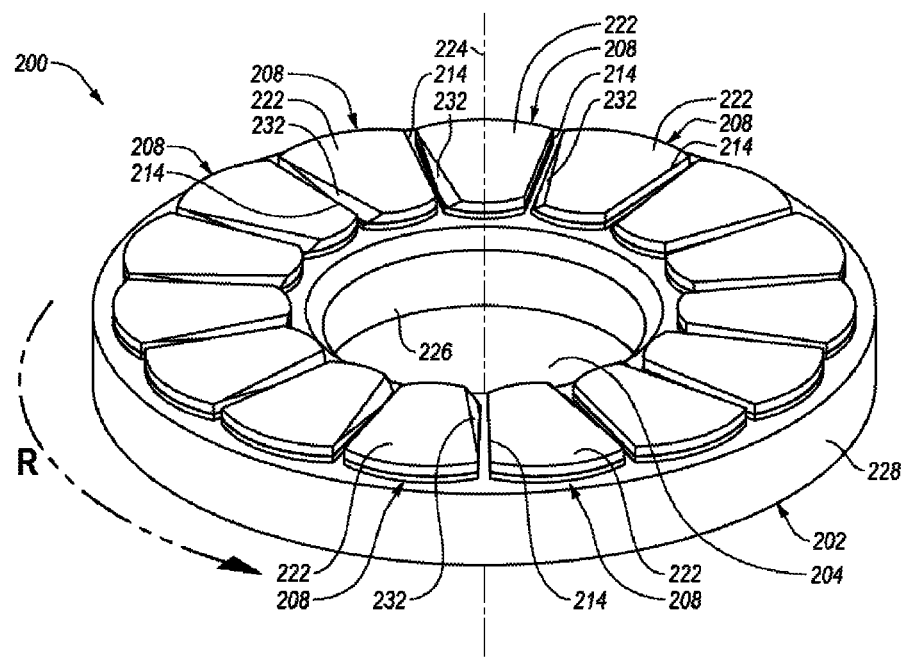
FIG. 2B is an isometric view of a thrust-bearing assembly utilizing the superhard bearing elements shown in FIG. 2A according to an embodiment.

FIG. 2B is an isometric view of a thrust-bearing assembly utilizing the superhard bearing elements 208 shown in FIG. 2A according to an embodiment. The thrust-bearing assembly 200 includes the superhard bearing elements 208 mounted or otherwise attached to a support ring 202. The bearing surface 222 of each superhard bearing element 208 may be substantially planar and generally lie in common plane with the bearing surfaces 222 of the other superhard bearing elements 208. Like the superhard bearing elements 108, one or more of the superhard bearing elements 208 may exhibit a peripherally extending edge chamfer. However, in other embodiments, the edge chamfer may be omitted.

Figure 2C:
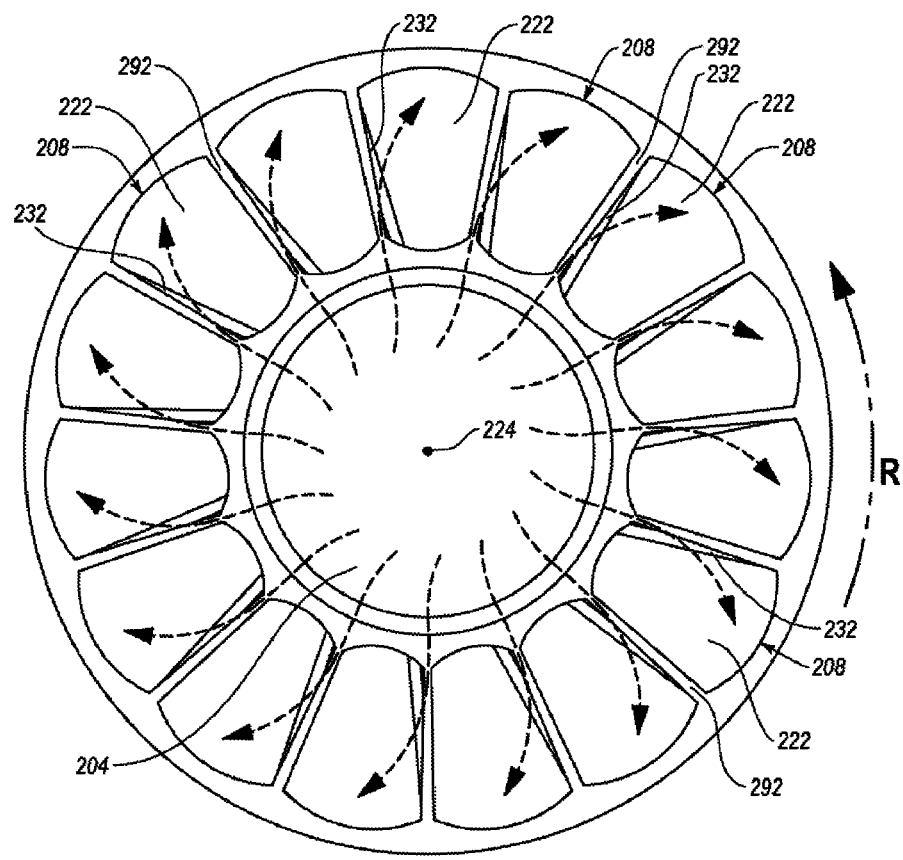
FIG. 2C is a top plan view of the thrust-bearing assembly shown in FIG. 2B.

The banked walls 232 are shown oriented in the same direction as a rotational direction R of the support ring 202. As illustrated in FIG. 2C, the superhard bearing elements 208 can be circumferentially distributed about a thrust axis 224 such that the banked wall 232 of one superhard bearing element 208 and the first side surface 214 of one adjacent superhard bearing element 208 may form the converging channels 292 between the superhard bearing elements 208. The converging channels 292 may narrow as they extend toward the outer peripheral surface 228 of the support ring 202. As shown by fluid flow direction arrows in FIG. 2C, when the support ring 202 rotates in the direction R about the thrust axis 224, centrifugal forces may cause lubricating fluid flowing out of a center opening 204 of the support ring 202 to be drawn toward the outer peripheral surface 228 of the support ring 202. As the lubricating fluid moves toward the outer peripheral surface 228, the converging channels 292 between the superhard bearing elements 208 may narrow and direct the lubricating fluid onto the bearing surfaces 222. In other embodiments, a portion of the superhard bearing elements 208 may be distributed about the thrust axis 224 with the banked walls 232 oriented in a first rotational direction and a portion of the superhard bearing elements 208 may be distributed about the support ring 202 with the banked walls 232 in a generally opposite second rotational direction. Thus, the converging channels 292 may direct lubricating fluid onto the bearing surfaces 222 of the superhard bearing elements 208 in both the first rotational direction and the second rotational direction. Accordingly, the bearing assemblies disclosed herein may be utilized in a system operational in both a forward and a reverse direction.

Figure 3:
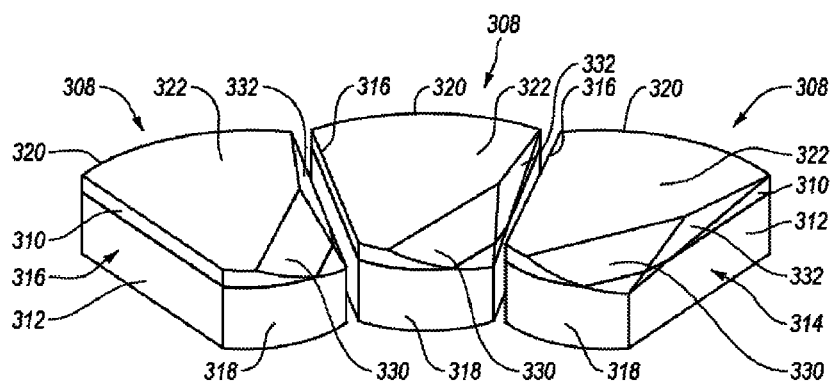
FIG. 3 is an isometric view of three side-by-side superhard bearing elements according to an embodiment.

FIG. 3 is an isometric view of three side-by-side superhard bearing elements 308 according to another embodiment that is a combination of the embodiments shown in FIGS. 1A-2C. The superhard bearing elements 308 may include a superhard table 310 bonded to a substrate 312 including a first side surface 314, a second side surface 316, a first end surface 318, and a second end surface 320, and a bearing surface 322 of the superhard table 310 extending between the first side surface 314, the second side surface 316, the first end surface 318, and the second end surface 320. As shown, the superhard bearing elements 308 may include a ramped surface 330 and a banked wall 332. As discussed above with respect the ramped surfaces 130 and the banked walls 232, both the ramped surfaces 330 and the banked walls 332 may help direct lubricating fluid onto the bearing surfaces 322 of the superhard bearing elements 308 during use.

Figure 4A:
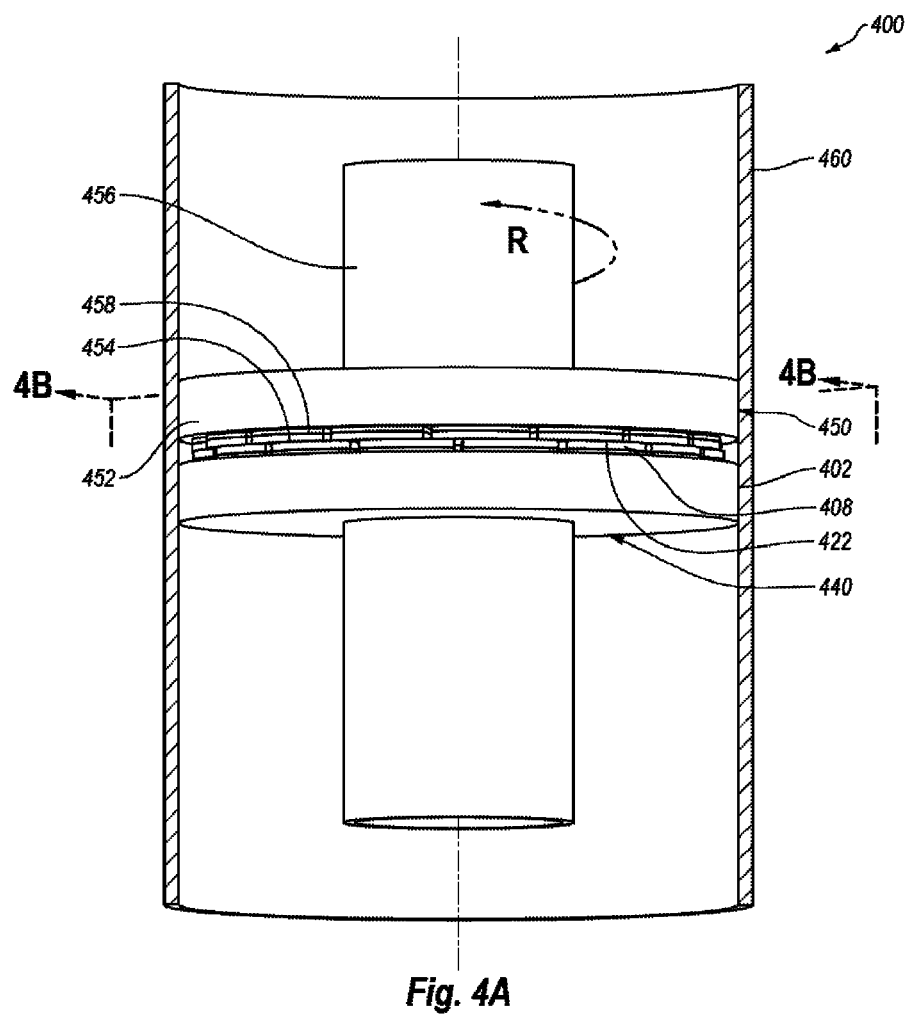
FIG. 4A is an isometric view of a thrust-bearing apparatus that may employ any of the disclosed thrust-bearing assemblies according to an embodiment, with the housing shown in cross-section.

Any of the above-described thrust-bearing assembly embodiments may be employed in a thrust-bearing apparatus. FIG. 4A is an isometric view of a thrust-bearing apparatus 400. The thrust-bearing apparatus 400 may include a stator 440 configured as any of the previously described embodiments of thrust-bearing assemblies. The stator 440 may include a plurality of circumferentially-adjacent superhard bearing elements 408. The superhard bearing elements 408 may include a bearing surface 422 and at least some of the superhard bearing elements 408 may exhibit, for example, the configuration of the superhard bearing elements 108. The superhard bearing elements 408 may be mounted or otherwise attached to a support ring 402. The thrust-bearing apparatus 400 further may include a rotor 450. The rotor 450 may include a support ring 452 and a plurality of superhard bearing elements 458 mounted or otherwise attached to the support ring 452, with each of the superhard bearing elements 458 having a bearing surface 454. As shown, a shaft 456 may be coupled to the support ring 452 and operably coupled to an apparatus capable of rotating the shaft 456 in a direction R (or in a generally opposite direction), such as a downhole motor. For example, the shaft 456 may extend through and may be secured to the support ring 452 of the rotor 450 by press-fitting or threadly coupling the shaft 456 to the support ring 452 or another suitable technique. A housing 460 may be secured to the support ring 402 of the stator 440 and may extend circumferentially about the shaft 456 and the rotor 450.

Figure 4B:
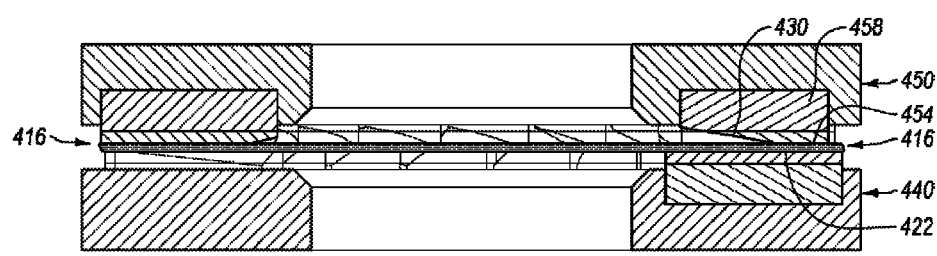
FIG. 4B is a cross-sectional view of the thrust-bearing apparatus shown in FIG. 4A taken along line 4B-4B.

The operation of the thrust-bearing apparatus 400 is discussed in more detail with reference to FIG. 4B. FIG. 4B is a cross-sectional view in which the shaft 456 and housing 460 are not shown for clarity. In operation, lubricating fluid, drilling fluid, or mud 416 may be pumped between the shaft 456 and the housing 460, and between the superhard bearing elements 458 of the rotor 450. The ramped surfaces 430 of the superhard bearing elements 458 of the rotor 450 may help direct and/or lift the lubricating fluid between the bearing surfaces 422 of the stator 440 and the bearing surfaces 454 of the rotor 450 which in turn can greatly reduce friction between the bearing surfaces 422 of the stator 440 and the bearing surfaces 454 of the rotor 450. Moreover, under certain operational conditions the thrust-bearing apparatus may be operated as a hydrodynamic bearing. For example, where the rotational speed of the rotor 450 is sufficiently great and the thrust load is sufficiently low, a fluid film 416 may develop between the bearing surfaces 422 of the stator 440 and the bearing surfaces 454 of the rotor 450. The fluid film 416 can have sufficient pressure to reduce or prevent contact between the respective bearing surfaces 422, 454 and thus, substantially reduce wear of the superhard bearing elements 458 and the superhard bearing elements 408. In such a situation, the thrust-bearing apparatus 400 may be described as operating hydrodynamically. Thus, the thrust-bearing apparatus 400 may be operated to improve lubrication of the contact area between the bearing surfaces 422 of the stator 440 and the bearing surfaces 454 of the rotor 450 and/or as a hydrodynamic bearing.

It is noted that in other embodiments, the rotor or stator may be configured as any of the previously described embodiments of thrust-bearing assemblies. Moreover, the disclosed thrust-bearing apparatuses may be used in a number of applications, such as downhole motors in subterranean drilling systems, directional drilling systems, pumps, transmissions, gear boxes, and many other applications.

Figure 5A:
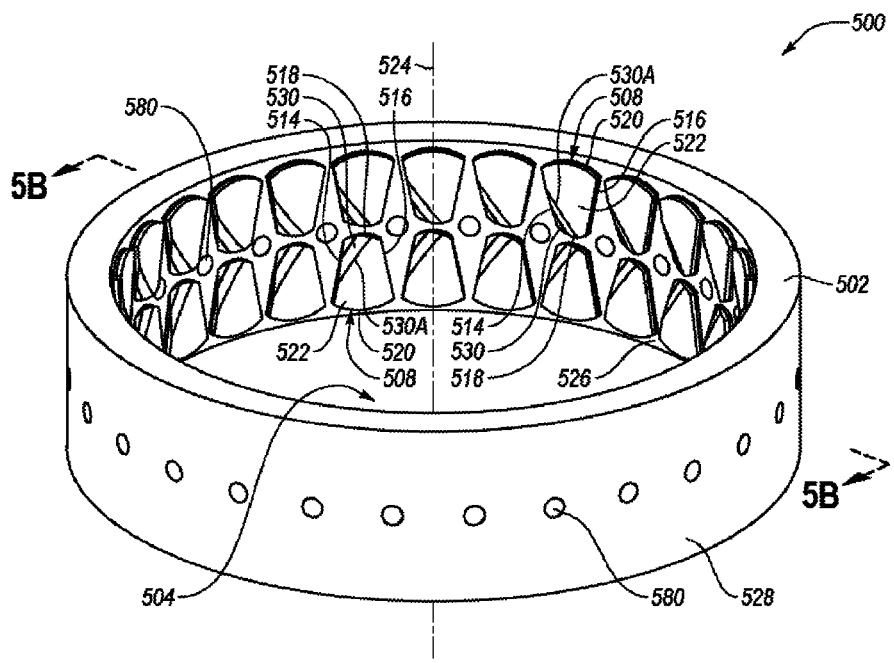
FIG. 5A is an isometric view of a radial bearing assembly according to an embodiment.
Figure 5B:
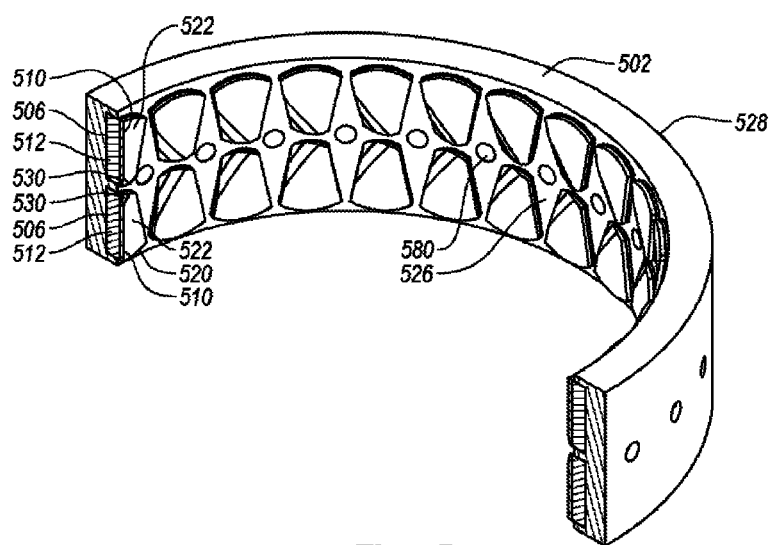
FIG. 5B is an isometric cutaway view of the radial bearing assembly shown in FIG. 5A taken along line 5B-5B.

The concepts used in the thrust-bearing assemblies and apparatuses described above may also be employed in the radial bearing assemblies and apparatuses. FIGS. 5A and 5B are isometric and isometric cutaway views, respectively, illustrating a radial bearing assembly 500 according to an embodiment. The radial bearing assembly 500 includes a support ring 502 extending about a rotation axis 524. The support ring 502 may include an inner peripheral surface 526 defining a central opening 504 that is capable of receiving, for example, an inner support ring or inner race. The support ring 502 may also include an outer peripheral surface 528 and a plurality of fluid conduits 580 extending between the inner peripheral surface 526 and the outer peripheral surface 528 through which lubricating or drilling fluid may enter or exit the central opening 504. A plurality of superhard bearing elements 508 may be distributed circumferentially about the rotation axis 524. At least some of the superhard bearing elements 508 may comprise a superhard table 510 including a concavely-curved bearing surface 522 curved to lie on an imaginary cylindrical surface. Each superhard table 510 may be bonded or attached to a corresponding substrate 512 (FIG. 5B). The superhard bearing elements 508 may be made from any of the materials discussed above for the superhard bearing elements 108. As with the superhard bearing elements 108, the superhard bearing elements 508 may include a first side surface 514, a second side surface 516, a first end surface 518, a second end surface 520, with the bearing surface 522 extending between the first end surface 518 and the second end surface 520. In an embodiment, at least some of the superhard bearing element 508 may include a ramped surface 530. The ramped surface 530 may extend between the first substantially planar side surface 514, the first end surface 518, and an edge 530A formed on the bearing surface 522 extending between the first end surface 518 and the first substantially planar side surface 514. The ramped surfaces 530 of the superhard bearing elements 508 may be positioned adjacent to the fluid conduits 580 and configured to direct lubricating fluid onto the bearing surfaces 522.

As illustrated in FIGS. 5A and 5B, the superhard bearing elements 508 may be distributed circumferentially about the rotation axis 524 in corresponding recesses 506 formed in the support ring 502 and arranged in a first row and a second row. The first row being illustrated above the fluid conduits 580 and the second row being illustrated below the fluid conduits 580. Such a configuration may allow lubricating fluid passing through the fluid conduits 580 to be directed onto the bearing surfaces 522 in either or both the illustrated upward or downward directions. In another embodiment, the superhard bearing elements 508 may be circumferentially distributed in a single row, three rows, or any number of rows.

Figure 6B:
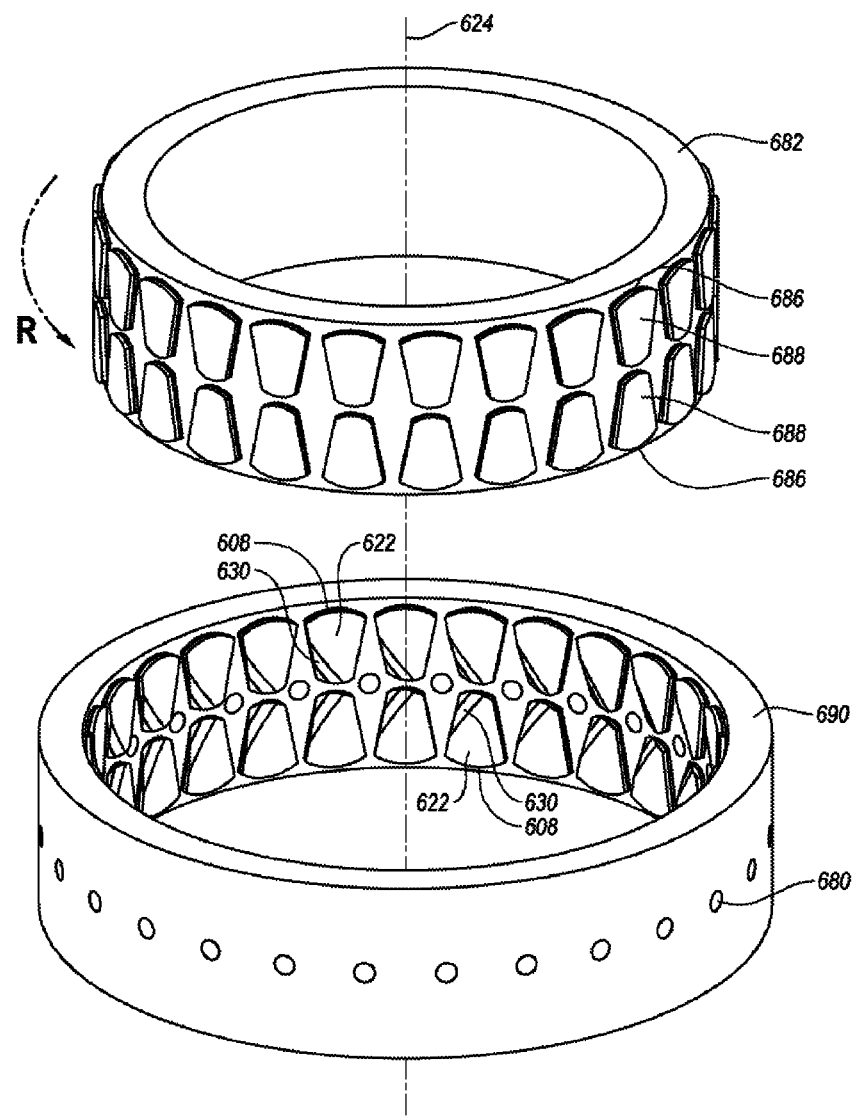
FIG. 6B is an exploded isometric view of the radial bearing apparatus shown in FIG. 6A.

FIGS. 6A and 6B are isometric cutaway and exploded isometric views, respectively, of a radial bearing apparatus 600 according to another embodiment. The radial bearing apparatus 600 may include an inner race 682 (i.e., a rotor). The inner race 682 may define an opening 684 and may include a plurality of circumferentially-adjacent superhard bearing elements 686 each of which includes a convexly-curved bearing surface 688. The radial bearing apparatus 600 may further include an outer race 690 (i.e., a stator) that extends about and receives the inner race 682. The outer race 690 may include a plurality of circumferentially-distributed superhard bearing elements 608, each of which includes a concavely-curved bearing surface 622 curved to correspond to the convexly-curved bearing surfaces 688. The superhard bearing elements 608 and 686 may each be made from any of the materials discussed above for the superhard bearing elements 108. The terms "rotor" and "stator" refer to rotating and stationary components of the radial bearing apparatus 600, respectively. Thus, if the outer race 690 is configured to remain stationary, the outer race 690 may be referred to as the stator and the inner race 682 may be referred to as the rotor.

At least some of the superhard bearing elements 608 may include a ramped surface 630 negatively sloping away from the bearing surface 622. The ramped surfaces 630 may be oriented in a rotational direction R of the inner race 682 about a rotation axis 624 to help direct lubricating fluid onto the bearing surfaces 622 of the superhard bearing elements 608 and the bearing surfaces 688 of the superhard bearing elements 686. Moreover, under certain operating conditions the ramped surfaces 630 may help direct lubricating fluid onto the bearing surfaces 688 of the rotor 682 to form a fluid film similar to the ramped surfaces of the superhard bearing elements 408 shown in FIGS. 4A and 4B. A shaft or spindle (not shown) may extend through the opening 684 and may be secured to the rotor 682 by press-fitting the shaft or spindle to the rotor 682, threadly coupling the shaft or spindle to the rotor 682, or another suitable technique. A housing (not shown) may also be secured to the stator 690 using similar techniques.

The radial bearing apparatus 600 may be employed in a variety of mechanical applications. For example, so-called "rotary cone" rotary drill bits, pumps, or turbines may benefit from a radial bearing apparatus disclosed herein.

It is noted that the inner race 682 of the radial bearing apparatus 600 is shown including a plurality of circumferentially-distributed superhard bearing elements 686 without ramped surfaces. However, in other embodiments, an outer race of a radial bearing apparatus may include a plurality of circumferentially-distributed superhard bearing elements 686 without ramped surfaces. In an embodiment, an inner race of the radial bearing apparatus 600 may include a plurality of circumferentially-distributed superhard bearing elements, each of which may include a ramped surface, as previously described, configured to help direct lubricating fluid onto the bearing surfaces of the outer race during operation. In other embodiments, either the inner race or the outer race may include fluid conduits formed in the respective support rings. Moreover, in other embodiments, the superhard bearing elements of either the inner race or outer race may include banked walls, as previously described.

In operation, rotation of the shaft sections (not shown) secured to the rotor 682 may effect rotation of the rotor 682 relative to the stator 690. Drilling fluid or other lubricant may be pumped through fluid conduits 680 of the stator 690 between the bearing surfaces 688 of the rotor 682. Similar to the description with respect to the thrust-bearing apparatus 400, the ramped surfaces 630 of the superhard bearing elements 608 may help direct lubricating fluid between the bearing surface 688 of the superhard bearing elements 686 and the bearing surfaces 622 of the superhard bearing elements 608. Moreover, under certain operational conditions and at sufficient rotational speeds for the rotor 682, a fluid film may develop between the bearing surface 688 of the superhard bearing elements 686 and the bearing surfaces 622 of the superhard bearing elements 608 having sufficient pressure to maintain the bearing surfaces 688 and the bearing surfaces 622 apart from each other. Accordingly, wear on the superhard bearing elements 608 and the superhard bearing elements 686 may be reduced.

Figure 7:
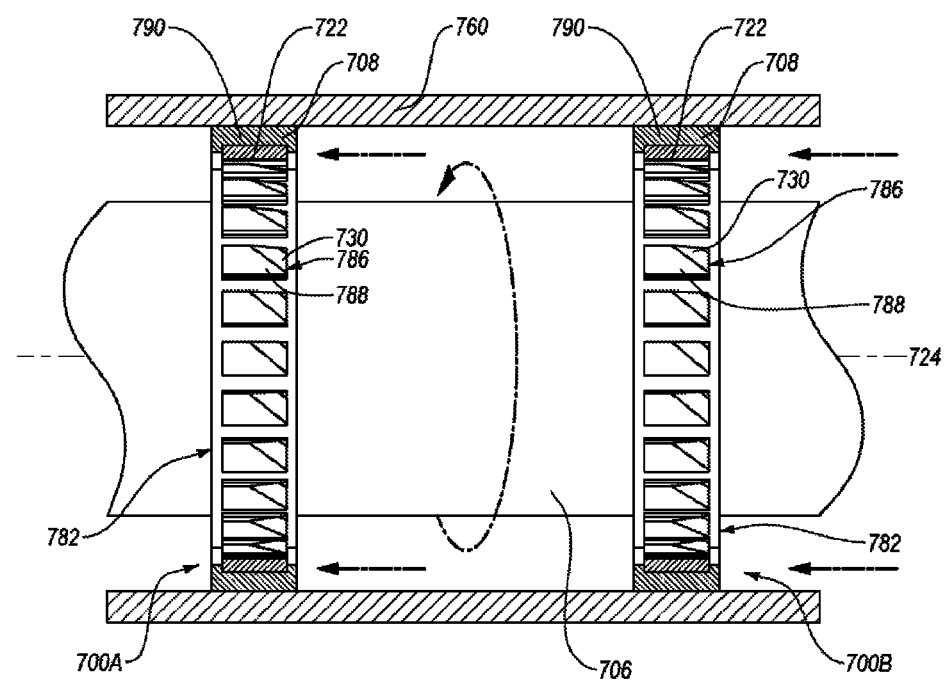
FIG. 7 is an isometric cutaway view of two radial bearing apparatuses according to an embodiment.

FIG. 7 is an isometric cutaway view of two radial bearing apparatuses 700A, 700B according to another embodiment. The radial bearing apparatuses 700A, 700B, may include an inner race 782 (i.e., a rotor). The inner race 782 may include one row of circumferentially-adjacent superhard bearing elements 786, each of which includes a convexly-curved bearing surface 788. In other embodiments, the inner race 782 may include two rows, three rows, or any number of rows of the circumferentially-adjacent superhard bearing elements 786.

The radial bearing apparatuses 700A, 700B may further include an outer race 790 (i.e., a stator) that extends about and receives the inner race 782. The outer race 790 may include one row of circumferentially-distributed superhard bearing elements 708, each of which includes a concavely-curved bearing surface 722 curved to correspond to the convexly-curved bearing surfaces 788. In other embodiments, the outer race 790 may include two rows, three rows, or any number of rows of the circumferentially-adjacent superhard bearing elements 708.

The superhard bearing elements 708 and 786 may be generally rectangular and each be made from any of the materials discussed above for the superhard bearing elements 108. The terms "rotor" and "stator" refer to rotating and stationary components of the radial bearing apparatuses 700A, 700B, respectively. Thus, if the outer race 790 is configured to remain stationary, the outer race 790 may be referred to as the stator and the inner race 782 may be referred to as the rotor.

At least some of the superhard bearing elements 786 may include a ramped surface 730 negatively sloping away from the bearing surface 788. The ramped surfaces 730 may be oriented in a rotational direction R of the inner race 782 about a rotation axis 724 to help direct lubricating fluid onto the bearing surfaces 722 of the superhard bearing elements 708 and the bearing surfaces 788 of the superhard bearing elements 786. A shaft or spindle 706 may extend through each inner race 782 and may be secured to each inner race 782 by press fitting the shaft or spindle 706 to the inner races 782, threadly coupling the shaft or spindle 706 to the inner races 782, or another suitable technique. A housing 760 may also be secured to the outer race 790 using similar techniques. The radial bearing apparatuses 700A, 700B may be employed in a variety of mechanical applications. For example, drill motors and pumps may benefit from the radial bearing apparatuses 700A, 700B.

Figure 8:
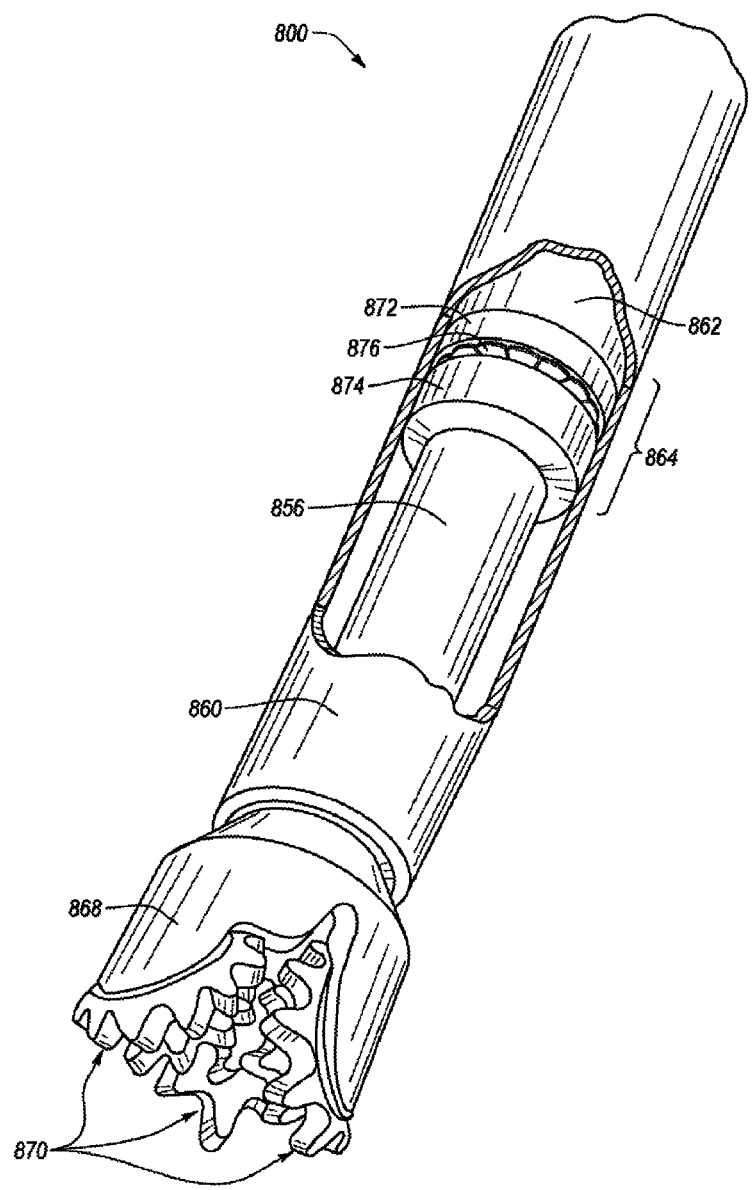
FIG. 8 is a schematic isometric cutaway view of a subterranean drilling system that may utilize any of the disclosed bearing assemblies according to various embodiments.

Any of the embodiments for bearing apparatuses discussed above may be used in a subterranean drilling system. FIG. 8 is a schematic isometric cutaway view of a subterranean drilling system 800 according to an embodiment. The subterranean drilling system 800 may include a housing 860 enclosing a downhole drilling motor 862 (i.e., a motor, turbine, or any other device capable of rotating an output shaft) that may be operably connected to an output shaft 856. A thrust-bearing apparatus 864 may be operably coupled to the downhole drilling motor 862. The thrust-bearing apparatus 864 may be configured as any of the previously described thrust-bearing apparatus embodiments. A rotary drill bit 868 may be configured to engage a subterranean formation and drill a borehole and may be connected to the output shaft 856. The rotary drill bit 868 is shown as a roller cone bit including a plurality of roller cones 870. However, other embodiments may utilize different types of rotary drill bits, such as so-called "fixed cutter" drill bits. As the borehole is drilled, pipe sections may be connected to the subterranean drilling system 800 to form a drill string capable of progressively drilling the borehole to a greater depth within the earth.

The thrust-bearing apparatus 864 may include a stator 872 that does not rotate and a rotor 874 that may be attached to the output shaft 856 and rotates with the output shaft 856. As discussed above, the thrust-bearing apparatus 864 may be configured as any of the embodiments disclosed herein. For example, the stator 872 may include a plurality of circumferentially-distributed superhard bearing elements 876 similar to the superhard bearing elements 408 shown and described in the thrust-bearing apparatus 400 of FIG. 4A. The rotor 874 may include a plurality of circumferentially-distributed superhard bearing elements (not shown) such as shown and described in FIGS. 1A-3.

In operation, drilling fluid may be circulated through the downhole drilling motor 862 to generate torque and effect rotation of the output shaft 856 and the rotary drill bit 868 attached thereto so that a borehole may be drilled. A portion of the drilling fluid may also be used to lubricate opposing bearing surfaces of the stator 872 and the rotor 874. When the rotor 874 is rotated, the ramped surfaces of the rotor 874 and the converging channels of the stator 872 may direct the drilling fluid onto the bearing surfaces of the stator 872 and the rotor 874, as previously discussed.

Although the bearing assemblies and apparatuses described above have been discussed in the context of subterranean drilling systems and applications, in other embodiments, the bearing assemblies and apparatuses disclosed herein are not limited to such use and may be used for many different applications, if desired, without limitation. Thus, such bearing assemblies and apparatuses are not limited for use with subterranean drilling systems and may be used with various mechanical systems, without limitation.

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall be open ended and have the same meaning as the word "comprising" and variants thereof (e.g., "comprise" and "comprises").

What is claimed is:

1. A bearing assembly, comprising:
   a support ring; and
   a plurality of superhard bearing elements mounted to the support ring, the plurality of superhard bearing elements distributed circumferentially about an axis, at least some of the plurality of superhard bearing elements including:
      a bearing surface; and
      at least one substantially planar surface configured to direct lubricating fluid onto the bearing surface, the at least one substantially planar surface facing partially in a radial direction relative to the axis, partially in a circumferential direction of the support ring, and partially in an axial direction relative to the axis.

2. The bearing assembly of claim 1 wherein:
   the at least some of the plurality of superhard bearing elements include:
      a first end surface;
      a second end surface spaced from and generally opposite to the first end surface;
      a first side surface extending between the first end surface and the second end surface;
      a second side surface generally opposite to the first side surface;
      the bearing surface extends between the first end surface, the second end surface, the first side surface and the second side surface; and
      at least one ramped feature having the at least one substantially planar surface defining a ramped surface sloping away from the bearing surface and toward the first end surface, the ramped surface further sloping toward one of the first side surface or the second side surface.

3. The bearing assembly of claim 2 wherein the ramped surface slopes away from the bearing surface at an angle of about 30 degrees to about 60 degrees relative to the bearing surface.

4. The bearing assembly of claim 2 wherein each of the first and second side surfaces is substantially planar.

5. The bearing assembly of claim 2 wherein the ramped surface extends between the first end surface, the first side surface, and an edge formed on the bearing surface.

6. The bearing assembly of claim 2 wherein at least one of the first end surface or the second end surface is arcuate.

7. The bearing assembly of claim 1 further comprising a plurality of converging channels defined between the at least some of the plurality of superhard bearing elements, each of the plurality of converging channels including the at least one substantially planar surface at least partially defining a banked surface that slopes with respect to the radial direction relative to the axis and the circumferential direction of the support ring.

8. The bearing assembly of claim 7 wherein the plurality of converging channels converge toward end surfaces of the at least some of the plurality of superhard bearing elements.

9. The bearing assembly of claim 1 wherein at least one of the plurality of superhard bearing elements exhibits a wedge shape.

10. The bearing assembly of claim 1 wherein at least one of the plurality of superhard bearing elements includes a substrate and a superhard table bonded to the substrate.

11. The bearing assembly of claim 10 wherein the superhard table includes a polycrystalline diamond.

12. The bearing assembly of claim 1 wherein the bearing surface of each of the at least some of the superhard bearing elements includes a convexly-curved bearing surface.

13. The bearing assembly of claim 1 wherein the bearing surface of each of the at least some of the superhard bearing elements includes a concavely-curved bearing surface.

14. The bearing assembly of claim 1 wherein the axis is a thrust axis, and wherein the support ring and the plurality of superhard bearing elements define a thrust-bearing assembly; or wherein the axis is a rotation axis, and wherein the support ring and the plurality of superhard bearing elements define a radial bearing assembly.

15. The bearing assembly of claim 1 wherein the at least one substantially flat surface slopes from the bearing surface towards the support ring.

16. A bearing apparatus, comprising:
   a first bearing assembly including:
      a first support ring; and
      a first plurality of superhard bearing elements mounted to the first support ring, the first plurality of superhard bearing elements distributed circumferentially about an axis, at least some of the first plurality of superhard bearing elements including:
         a first bearing surface; and
         at least one substantially planar surface configured to direct lubricating fluid onto the first bearing surface, the at least one substantially planar surface facing partially in a radial direction relative to the axis, partially in a circumferential direction of the first support ring, and partially in an axial direction relative to the axis;
      and
   a second bearing assembly including:
      a second support ring; and
      a second plurality of superhard bearing elements mounted to the second support ring, the second plurality of superhard bearing elements generally opposed to the first plurality of superhard bearing elements of the first bearing assembly.

17. The bearing apparatus of claim 16 wherein the first bearing assembly is configured as a rotor and the second bearing assembly is configured as a stator.

18. The bearing apparatus of claim 16 wherein the at least one substantially flat surface slopes from the bearing surface towards the first support ring.

19. A motor assembly, comprising:
   a motor operable to apply torque to a rotary drill bit, the motor operably coupled to a bearing apparatus, the bearing apparatus including a rotor and a stator; and
      wherein at least one of the stator or the rotor includes:
         a support ring; and
         a plurality of superhard bearing elements mounted to the support ring, the plurality of superhard bearing elements distributed circumferentially about an axis, at least some of the plurality of superhard bearing elements including:

a bearing surface; and at least one substantially planar surface configured to direct lubricating fluid onto the bearing surface, the at least one substantially planar surface facing partially in a radial direction relative to the axis, partially in a circumferential direction of the support ring, and partially in an axial direction relative to the axis.

20. The motor assembly of claim 19 wherein the at least one substantially flat surface slopes from the bearing surface towards the support ring.

\* \* \* \* \*